United States Patent [19]

Gray

[11] 4,324,078
[45] Apr. 13, 1982

[54] FIRE-RESISTANT FLOOR STRUCTURE

[75] Inventor: Charles R. Gray, Coraopolis, Pa.

[73] Assignee: H. H. Robertson Company, Pittsburgh, Pa.

[21] Appl. No.: 131,829

[22] Filed: Mar. 19, 1980

[51] Int. Cl.³ .......................... H02G 3/08; E04F 17/08
[52] U.S. Cl. .......................................... 52/221; 174/48; 169/48
[58] Field of Search .................. 52/232, 221; 174/151, 174/48, 49, 50; 169/48

[56] References Cited

U.S. PATENT DOCUMENTS

| | | | |
|---|---|---|---|
| 3,420,018 | 7/1969 | Fork | 52/221 |
| 3,864,883 | 2/1975 | McMarlin | 52/221 |
| 3,932,696 | 1/1976 | Fork et al. | 174/48 |
| 3,973,366 | 8/1976 | Barane | 52/221 |
| 4,061,344 | 12/1977 | Bradley | 52/232 |
| 4,179,319 | 12/1979 | Lofdahl | 174/151 |
| 4,223,175 | 9/1980 | Crew | 169/48 |
| 4,232,493 | 11/1980 | Gray et al. | 52/221 |
| 4,249,353 | 2/1981 | Berry | 52/232 |
| 4,289,921 | 9/1981 | Gartner et al. | 174/48 |

*Primary Examiner*—John E. Murtagh
*Attorney, Agent, or Firm*—G. E. Manias

[57] ABSTRACT

Apparatus for fireproofing an underfloor access chamber of an electrical wiring distributing floor structure. The access chamber is formed between a cellular unit and a covering layer of concrete. The access chamber has at least one inlet opening communicating with a raceway presented by the cellular unit; and an outlet opening providing access to the chamber from the space above the concrete. An unobtrusive strip of fire-resistant material, disposed within the chamber, covers substantially entirely all of the bottom portion and obstructs the inlet opening. The strip shields the upper portion of the chamber from heat transfer by convection and by radiation. Slit means formed in the strip allows passage of wiring without significantly deteriorating obstruction of the inlet opening.

10 Claims, 7 Drawing Figures

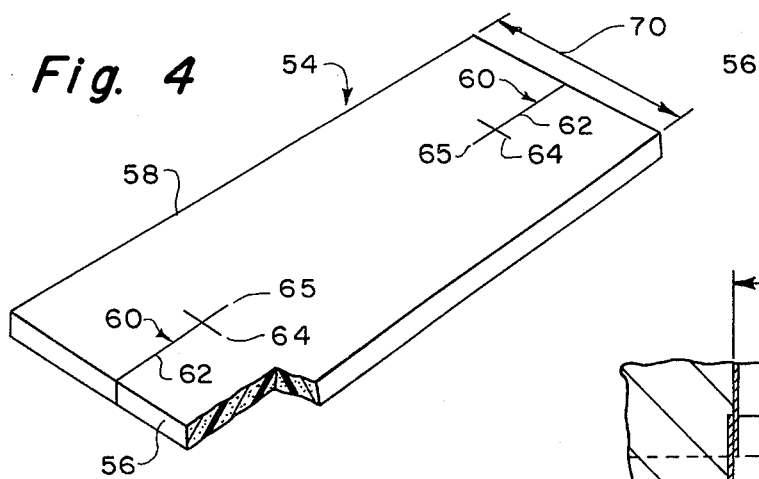
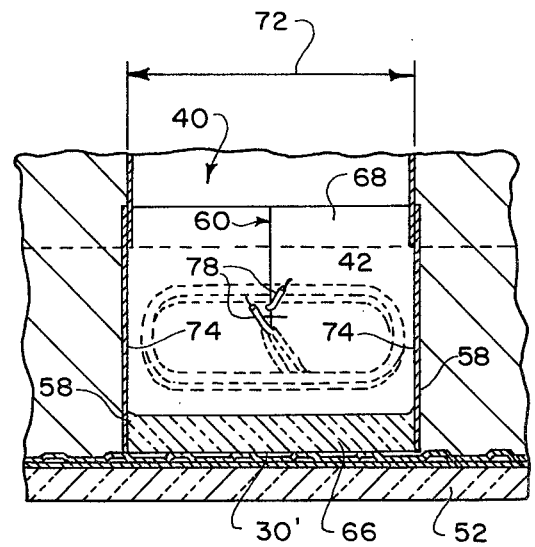
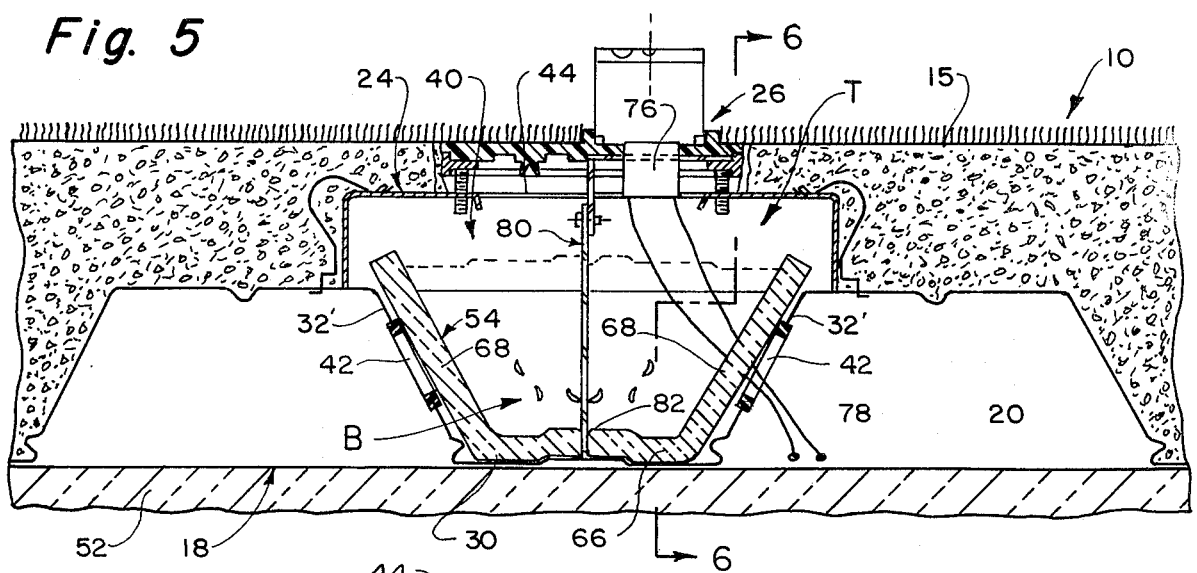
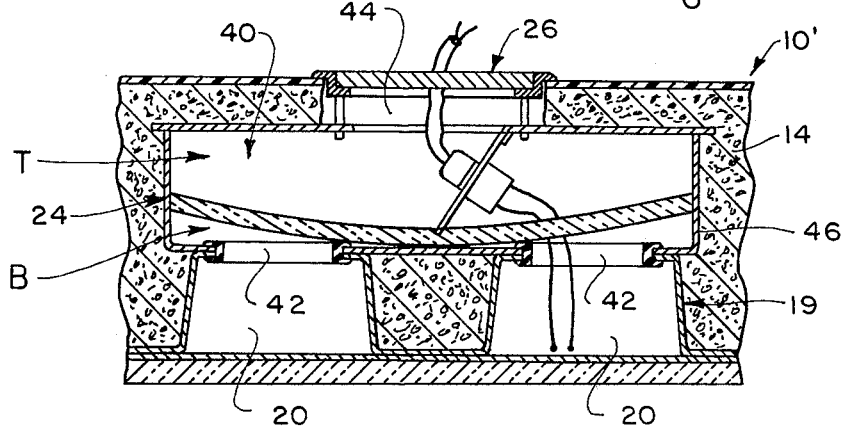

FIRE-RESISTANT FLOOR STRUCTURE

BACKGROUND OF THE INVENTION

1. Field of the Invention:

This invention relates to electrical wiring distributing floor structures, and more particularly to improved means for fireproofing an underfloor access chamber of such floor structures.

2. Description of the Prior Art:

Floor structures particularly adapted to distribute electrical wiring are known which comprise, for example, a metal cellular unit providing enclosed wire carrying cells, a covering layer of concrete, and one or more inserts positioned between the metal cellular unit and the covering layer of concrete. Each insert provides an access chamber communicating with at least one of the cells of the cellular unit. Access to the chamber is achieved by removing a covering portion of the concrete and installing capping means. The capping means provides ready access to the chamber for making connections to the individual electrical services available therein at one location in the floor structure.

Such floor structures must be capable of containing a fire burning, for example, in the space below the floor structure for a period of time sufficient to permit the building occupants to move safely out of the building. The fire containment time—commonly referred to as the "fire rating"—is expressed as "2-hour," "½-hour," etc.

Useful "fire ratings" are achieved by the addition of external and internal fireproofing to the floor structure. The external fireproofing—provided at the lower face of the floor structures—may comprise field-sprayed material, gypsum board or other membranes such as fire rated suspended ceiling. Internal fireproofing—installed within the chamber—may comprise plural components of intumescent material, rigid glass fiberboard, standard gypsum wallboard and gypsum blocks, etc. Examples of inserts incorporating intumescent material will be found in U.S. Pat. Nos. 3,864,883 (McMARLIN) and 3,932,696 (FORK et al.). An example of a floor structure incorporating external and internal fireproofing will be found in copending application Ser. No. 901,063 (GRAY et al.) filed Apr. 28, 1978 and assigned to the assignee of the present invention.

Under fire conditions, heat is transmitted through the floor structure from the fire-exposed face to the unexposed face. Heat transmission occurs by conduction, by convection and by radiation. The external and internal fireproofing and the inherent fire-resistant properties of the floor structure components cooperate to retard heat transmission thereby extending the time period—the "fire rating"—during which the unexposed face of the floor structure attains a critical elevated temperature. Once the exposed face attains the critical elevated temperature, the floor structure is no longer considered capable of performing its fire-containment function.

The intumescent materials disclosed by McMARLIN and FORK et al., when activated, foam and expand to substantially entirely fill the chamber. However, activation occurs only after the material is subjected to an elevated temperature, e.g., temperatures in excess of 250° F. Up to activation, the capping means at the unexposed surface of the floor structure are continuously subjected to the ever increasing temperature.

The arrangement of internal insulating components disclosed by GRAY et al. provide the floor structure with useful "fire ratings." However, the multiple insulating components add significantly to the cost of capping means and reduce the space available within the chamber for making electrical connections.

SUMMARY OF THE INVENTION

The principal object of the present invention is to provide internal insulation which, during fire conditions, shields the upper portion of the chamber against heat transfer by convection and by radiation.

Another object of this invention is to provide internal insulation in the form of an unobtrusive strip of fire-resistant material which does not significantly reduce the usable working space within the chamber.

In accordance with the present invention, apparatus is provided for fireproofing an access chamber formed between a metal cellular unit and a covering layer of concrete. The access chamber includes a bottom portion extending between adjacent raceways provided by the cellular unit with at least one inlet opening communicating with one of the raceways, and a top portion with an outlet opening providing access to the chamber from the upper surface of the covering layer of concrete. An unobtrusive strip of fire-resistant material is provided which covers substantially entirely all of the bottom portion of the chamber and which completely obstructs the inlet opening. Slit means is provided in the strip for passing wiring between the cell and the chamber without significantly deteriorating the obstruction of the inlet opening. The arrangement is such that under fire conditions, the strip shields the capping elements situated at the outlet opening from convection currents of hot gases which would pass through the inlet opening and from high temperature radiation emitted by elements in the bottom portion of the chamber.

BRIEF DESCRIPTION OF THE DRAWINGS

FIG. 4 is a perspective view of a strip of fire-resistant material according to the present invention;

FIG. 5 is a view similar to FIG. 2 illustrating the present fireproofing arrangement; and FIG. 6 is a cross-sectional view taken along the line 6—6 of FIG. 5;

FIG. 7 is a view, similar to FIG. 3, illustrating the present fireproofing arrangement.

DESCRIPTION OF THE PREFERRED EMBODIMENT(S)

Figure 1:
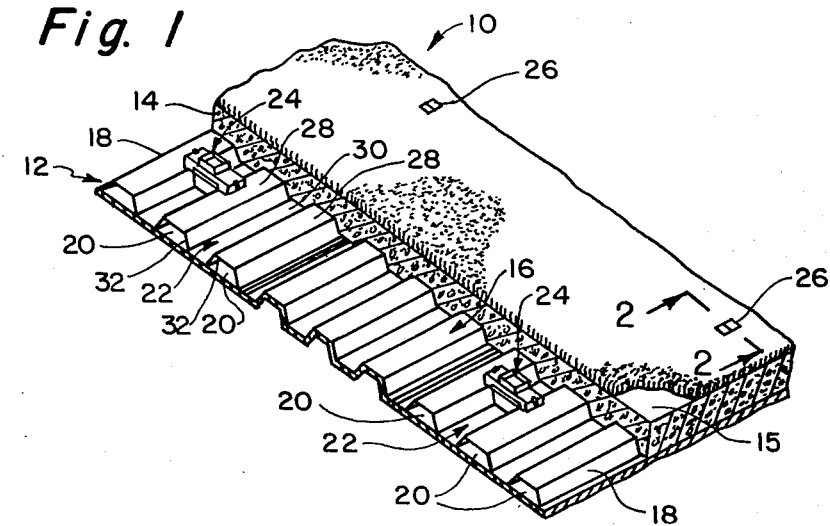
FIG. 1 is a fragmentary isometric view of a fire-resistant floor structure.

FIG. 1 illustrates a fragment floor structure 10 comprising a metal subfloor 12 and a covering layer of monolithic concrete 14. The metal subfloor 12 may include non-cellular metal decking units 16 and metal cellular flooring units 18 which are co-mingled in a preselected pattern to allow for present and future distribution of electrical services throughout the floor structure 10. If desired, the metal subfloor 12 may include only the metal cellular flooring units 18.

The metal cellular flooring units 18 provide plural, generally parallel, enclosed cells 20 separated by lengthwise troughs 22. The cells 20 distribute the electrical wiring of different electrical services throughout the floor structure 10.

Underfloor insert means 24 is provided at selected locations in the metal subfloor 12, prior to pouring the concrete 14. Each of the insert means 24 provides for present and future access to the different electrical services at one location in the finished surface of the floor structure 10. After the concrete 14 has hardened, selected ones of the housings 24 are activated by installing capping means 26 which offers ready access to the different electrical services provided at each of the insert means 24.

CELLULAR UNIT 18

The cellular unit 18 (FIG. 1) provides a plurality of relatively wide cells 20. Adjacent ones of the cells 20 present spaced crests 28 separated by a relatively wide trough 22. Each of the troughs 22 comprise a valley 30 and confronting webs 32 connecting the valley 30 to the crests 28. The cellular unit 19 (FIG. 3) presents cells 20 with crests 28. Adjacent cells 20 are separated by a relatively narrow trough 22'. While differing in cell and trough configuration, the cellular units 18 and 19 perform the same wire distributing function.

INSERT MEANS 24

The insert means 24 provides an underfloor access chamber within which temporary and permanent connections are made to the available electrical services. There are two general types of underfloor insert means in common use today.

In a first type (FIG. 2) the insert means 24 comprises a housing 34 including closure elements 36 which cooperate with a valley segment 30' and the adjoining web segments 32' to enclose a trough space 38. Inlet openings 42 provided in the web segments 32' establish communication between the trough space 38 and the cells 20. An outlet opening 44 provides access to the interior of the housing 34 from the upper surface 15 of the floor structure 10.

In a second type, (FIG. 3), the access means 24 comprises a totally enclosed housing 46 having a base 47 extending across the crests 28 of the adjacent cells 20. Inlet openings 42 are provided in the crests 28 and the base 47. An outlet opening 44 provides access to the interior of the housing 46 from the upper surface 15 of the floor structure 10'.

In either of the above-described types, the insert means 24 provides an underfloor access chamber 40 formed between the concrete 14 and the cellular unit 18 (19). The chamber 40 has a bottom portion B extending between the adjacent raceways 20 with at least one inlet opening 42 communicating with one of the cells 20; and has a top portion T with the outlet opening 44 providing access to the chamber 40 from the upper surface 15.

Figure 2:
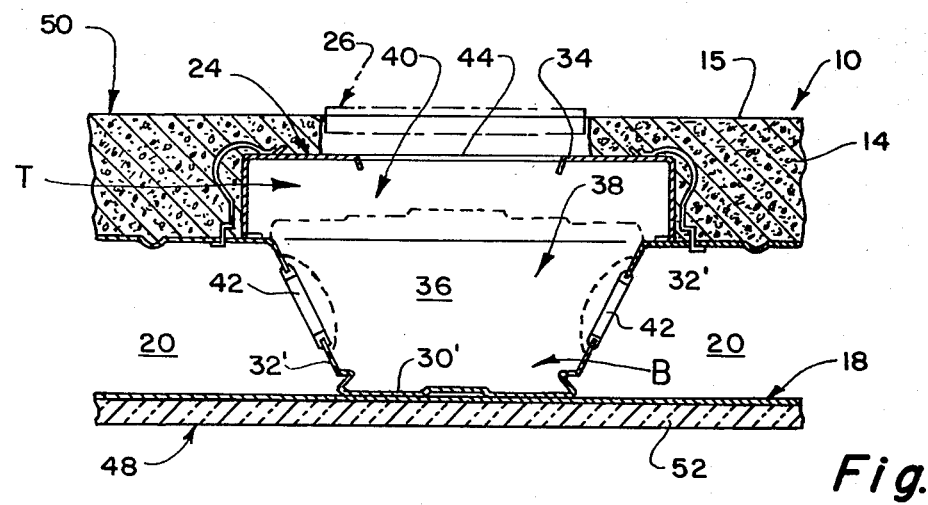
FIG. 2 is a cross-sectional view taken along the line 2—2 of FIG. 1 illustrating underfloor insert means.
Figure 3:
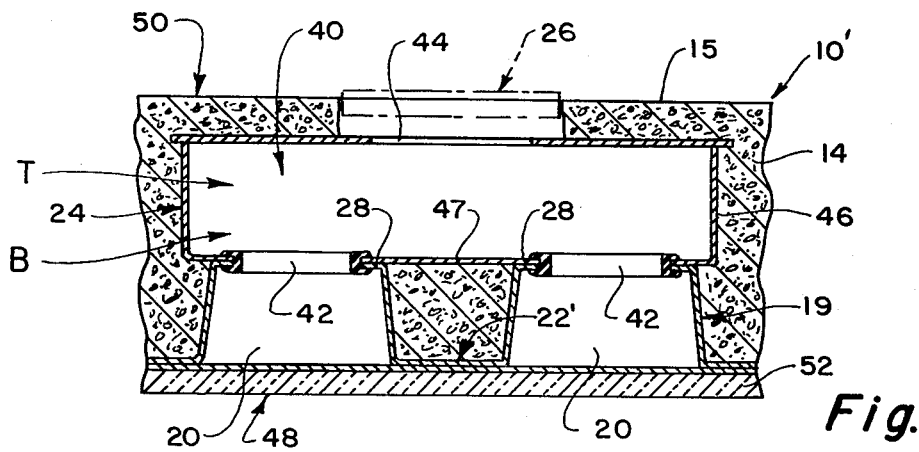
FIG. 3 is a fragmentary cross-sectional view, similar to FIG. 2, illustrating a second type of underfloor insert means.

It will be observed in FIGS. 2 and 3 that should a fire occur in the space below, the floor structures 10, 10' present a lower or fire-exposed face 48 and an upper or unexposed face 50. As the fire progresses, the decking unit 18 (19) rapidly increases in temperature. The concrete 14 tends to insulate the unexposed face 50 and the space above the floor structure 10 (10') from the elevated temperatures. However the metal-to-metal contact between the decking unit 18 (19) and the housing 34 (46) provides a path for heat transfer by conduction from the exposed face 48 to a region below the unexposed face 50 and to the capping means 26. However, convection and radiation are also operative in increasing the temperature of the top portion T. For example, the temperature of the top portion T of the chamber 40 is increased:

(a) by exposure of high temperature radiation emitted by the hot surfaces of the cells 20 in FIG. 2 or of the base 47 in FIG. 3; and (b) by convection currents of hot gases which flow from the cells 20 through the inlet openings 42 to the chamber 40 and impinge on the capping means 26.

Heretofore, the rate of heat transfer has been significantly reduced by applying a layer of external fireproofing material 52 to the undersurface of the flooring unit 18 (19). As can be seen in FIG. 1, the fireproofing material 52 is applied to the entire undersurface of the flooring units 18 and of the non-cellular decking units 16. Heretofore, internal fireproofing also has been provided within the chamber 40 as an additional means for decreasing the rate of heat transfer. However in prior art arrangements, the internal insulation occupied a large part of the chamber thereby reducing the space available for making electrical connections. In addition, the prior art arrangements did not consider the effects of convection and radiation.

PRESENT INVENTION

This invention provides internal insulation in the form of a strip 54 of fire-resistant material (FIG. 4). To facilitate installation in the chamber 40, the strip 54 preferably is formed from a single piece of material which is dimensional to conform with the shape of the chamber. The strip 54 may, if desired, be formed from plural pieces of material. As illustrated in FIG. 4, the strip 54 has a generally rectangular shape including opposite ends 56 and opposite sides 58. Slit means 60, one at each end of the strip 54, provide for passage of wiring. Each slit means 60 may comprise an axial slit 62 extending from one end 56 toward the opposite end 56; and a transverse slit 64 provided adjacent to the inner end 65 of the axial slit 62.

The strip 54 preferably is formed from a resilient fire-resistant material, such as, neoprene foam, or from flexible fire-resistant materials, such as, glass fiber mat and the like. A resilient material found suitable for use in the present invention is identified as #95 LS Neoprene Foam, Firm Density (Average 8.86 PSF) and is available from the NAFI division of Chris Craft Industries, Inc., Trenton, N.J.

Broadly in accordance with the present invention, the strip 54 (FIGS. 5 and 7) is introduced into the chamber 40 through the inlet opening 44 during activation of the insert means 24. The strip 54 is positioned to cover substantially entirely all of the bottom portion B of the chamber 40, and to obstruct the inlet openings 42. The arrangement is such that, under fire conditions, the strip 54 shields the elements in the top portion T of the chamber 40 from convection currents of hot gases which would normally pass through the inlet openings 42 and from high temperature radiation emitted by the hot surfaces presented in the bottom portion B.

It will be observed in FIGS. 5 and 6 that the strip 54—being formed from flexible material—readily assumes the generally U-shaped profile of the chamber bottom portion B. The strip 54 presents a central portion 66 disposed in covering relation with the valley segment 30', and opposite end portions 68, each disposed in covering relation with the adjacent web segment 32' and in obstructing relation with the adjacent inlet opening 42. In the preferred arrangement, the width 70 (FIG. 4) of the strip 54 is greater than the width 72 (FIG. 6) of the chamber 40. When installed, the strip 54 is compressed between the confronting surfaces 74 of the chamber 40 and is retained in position by frictional engagement of the strip opposite sides 58 with the confronting chamber surfaces 74.

The capping means 26 (FIG. 5) presents an outlet fitting 76 adjacent to the upper surface 15. Electrical wiring 78 extends from the cell 20, through the inlet opening 42, the slit means 60 (not visible in FIG. 5) to the fitting 76. It will be observed in FIG. 6 that the flexible strip 54 molds itself about the exiting wiring 78. Hence the wires 78 pass through the strip 54 without significantly deteriorating the obstruction of the inlet opening 42 by the strip 54.

It will further be observed in FIG. 5 that the outlet fitting 76 is supported, in part, by partition means 80 which divides the chamber 40 into separate compartments. The lower end 82 of the partition means 80 is engaged with the strip 54 and is insulated from contact with the valley segment 30'.

It will be observed in FIG. 7 that the strip 54 covers substantially entirely all of the bottom portion B of the chamber 40 and obstructs the inlet openings 42. In the preferred arrangement, the width and length of the strip 54 is slightly greater than the width and length of the insert means 40 so that the strip 54 is retained in the illustrated position by frictional engagement with the interior surfaces of the housing 46.

I claim:

1. Apparatus for fireproofing an underfloor access chamber comprising:
    a metal cellular unit providing spaced-apart raceways for distributing electrical wiring;
    a covering layer of concrete having an upper surface;
    insert means forming an access chamber between said concrete and said cellular unit, said chamber having a bottom portion extending between adjacent raceways with inlet openings each communicating with one of said adjacent raceways, and having a top portion with an outlet opening providing access to said chamber from said upper surface;
    an unobtrusive resilient strip of fire-resistant material covering all of said bottom portion and obstructing said inlet openings; and
    slit means in said resilient strip for passing wiring between each raceway and said chamber without significantly deteriorating the obstruction of said inlet openings;
    whereby under fire conditions, said resilient strip shields said top portion from convection currents of hot gases which would normally pass through said inlet openings and from high temperature radiation emitted by hot surfaces of said bottom portion.

2. The apparatus defined in claim 1 including external fireproofing confronting the lower face of said cellular unit.

3. The apparatus defined in claim 1 wherein said strip is formed from a resilient foamed plastic.

4. The apparatus defined in claim 3 wherein said foamed plastic comprises foamed neoprene.

5. The apparatus defined in claim 1 wherein said strip is formed from flexible glass fiber mat.

6. The apparatus defined in claim 1, 3, 4 or 5 wherein the width of said resilient strip is greater than the width of said chamber, said resilient strip being compressed between confronting surfaces of said chamber and thereby retained in position.

7. An electrical wiring distributing floor structure including:
    a metal cellular unit providing plural cells, adjacent cells presenting spaced crests separated by a trough, each trough comprising a valley and confronting webs connecting said valley to said crests;
    a covering layer of concrete having an upper surface;
    insert means forming an access chamber between said concrete and said cellular unit, said chamber having confronting side walls cooperating with a valley segment and with web segments of said cellular unit to define a trough space;
    access means providing access to said chamber from said upper surface;
    inlet openings, one presented by each of said web segments; and
    an unobtrusive resilient strip of fire-resistant material including a central portion covering all of said valley segment, and opposite end portions, each covering all of one of said web segments and obstructing the inlet opening thereof; and
    slit means, one in each of said end portions, for passing electrical wiring between the adjacent cell and said chamber without significantly deteriorating the obstruction of said inlet openings;
    whereby under fire conditions, said resilient strip shields said top portion from convection currents of hot gases which would normally pass through said inlet openings and from high temperature radiation emitted by hot surfaces of said bottom portion.

8. The floor structure defined in claim 7 wherein each of said slit means extends from a terminal edge of the end portion toward said central portion.

9. The floor structure defined in claim 7 or 8 including
    external fireproofing confronting the lower face of said floor structure.

10. The apparatus defined in claim 7 or 8 wherein the width of said resilient strip is greater than the distance between said confronting side walls, said resilient strip being compressed between said confronting side walls and thereby retained in position.

* * * * *